United States Patent
Hrebicek et al.

(10) Patent No.: US 9,367,549 B2
(45) Date of Patent: *Jun. 14, 2016

(54) VIRTUAL PRIVATE CLOUD THAT PROVIDES ENTERPRISE GRADE FUNCTIONALITY AND COMPLIANCE

(71) Applicant: EMC Corporation, Hopkinton, MA (US)

(72) Inventors: Ondrej Hrebicek, San Carlos, CA (US); Leonard Chung, San Francisco, CA (US)

(73) Assignee: EMC Corporation, Hopkinton, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/472,209

(22) Filed: Aug. 28, 2014

(65) Prior Publication Data

US 2014/0372382 A1    Dec. 18, 2014

Related U.S. Application Data

(63) Continuation of application No. 13/530,763, filed on Jun. 22, 2012, now Pat. No. 8,850,516.

(60) Provisional application No. 61/500,036, filed on Jun. 22, 2011.

(51) Int. Cl.
*G06F 17/00* (2006.01)
*G06F 17/30* (2006.01)
*H04L 29/06* (2006.01)

(52) U.S. Cl.
CPC .... *G06F 17/30085* (2013.01); *G06F 17/30082* (2013.01); *G06F 17/30117* (2013.01); *G06F 17/30174* (2013.01); *G06F 17/30289* (2013.01); *H04L 63/10* (2013.01)

(58) Field of Classification Search
CPC . H04L 12/244; H04L 41/0893; H04L 63/108; G06F 2212/502; G06F 2212/6046; G06F 11/0781; G06F 11/3072
USPC ........... 726/1, 7; 713/150, 151; 709/202, 248; 707/610
See application file for complete search history.

(56) References Cited

U.S. PATENT DOCUMENTS 7,693,758 B1    4/2010    Bacco et al.
8,504,519 B1    8/2013    Sachs et al.
(Continued)

OTHER PUBLICATIONS

Author Unknown, Syncplicity On-Premise Storage Design & Architecture Overview 2013.
(Continued)

*Primary Examiner* — Thanhnga B Truong
(74) *Attorney, Agent, or Firm* — Van Pelt, Yi & James LLP

(57) ABSTRACT

Techniques to enforce policies with respect to managed files and/or endpoints are disclosed. A policy to be applied with respect to a synchronization set is received at a file management system. Compliance with the policy across a plurality of heterogeneous endpoints associated with the synchronization set is ensured by propagating the policy to the heterogeneous endpoints. Each of the endpoints is configured to enforce at the endpoint policies received from the file management system, including by responding in a manner prescribed by the policy to occurrence of a policy-triggering event defined in the policy.

23 Claims, 14 Drawing Sheets

(56) References Cited

U.S. PATENT DOCUMENTS

| | | | |
|---|---|---|---|
| 8,565,726 B2* | 10/2013 | Walker et al. | 455/411 |
| 8,738,706 B1 | 5/2014 | Grieve et al. | |
| 8,825,597 B1 | 9/2014 | Houston et al. | |
| 2003/0172113 A1 | 9/2003 | Cameron et al. | |
| 2003/0182450 A1 | 9/2003 | Ong et al. | |
| 2005/0055465 A1 | 3/2005 | Sato | |
| 2005/0073991 A1 | 4/2005 | Roberts et al. | |
| 2005/0289350 A1 | 12/2005 | Schmidt-Karaca | |
| 2007/0245223 A1 | 10/2007 | Siedzik et al. | |
| 2007/0282914 A1 | 12/2007 | Sivapragasam et al. | |
| 2008/0005188 A1 | 1/2008 | Li et al. | |
| 2009/0006936 A1 | 1/2009 | Parker et al. | |
| 2009/0083441 A1* | 3/2009 | Clark et al. | 709/248 |
| 2009/0271696 A1 | 10/2009 | Bailor et al. | |
| 2009/0300169 A1 | 12/2009 | Sagar et al. | |
| 2009/0327358 A1 | 12/2009 | Lukiyanov et al. | |
| 2010/0112983 A1 | 5/2010 | Walker et al. | |
| 2010/0125897 A1* | 5/2010 | Jain et al. | 726/7 |
| 2010/0223400 A1 | 9/2010 | McCarthy et al. | |
| 2011/0320469 A1 | 12/2011 | Canessa et al. | |
| 2012/0109887 A1 | 5/2012 | Ziemann et al. | |
| 2012/0317077 A1 | 12/2012 | Chung | |
| 2012/0331108 A1 | 12/2012 | Ferdowsi et al. | |
| 2013/0124612 A1 | 5/2013 | Braginsky et al. | |
| 2014/0040202 A1 | 2/2014 | Hagan et al. | |

OTHER PUBLICATIONS

Josh Linden, EMC Syncplicity Review, Mar. 18, 2013.
Author Unknown, EMC, EMC Today, 2012.
Schadler et al., The Forrester Wave: File Sync and Share Platforms Q3 2013, Jul. 10, 2013.
U.S. Appl. No. 13/530,830, Office Action Mailed Nov. 3, 2014.
U.S. Appl. No. 13/530,842, Office Action mailed Sep. 3, 2014.
Zoli's Blog, Syncplicity: Simply Excellence Synchronization, Online Backup, Jul. 6, 2008.
Author Unknown, New Syncplicity Business Edition Release Delivers Corporate File Management in the Cloud with Mac Support, Oct. 5, 2010.
David Appleyard, AJ's Emporium Syncplicity: Innovative Backup and Syncing, Feb. 2, 2009.
Microsoft, Live Mesh, Synchronize Your Life, Live Mesh Handbook, Winter 2009.

* cited by examiner

VIRTUAL PRIVATE CLOUD THAT PROVIDES ENTERPRISE GRADE FUNCTIONALITY AND COMPLIANCE

CROSS REFERENCE TO OTHER APPLICATIONS

This application is a continuation of co-pending U.S. patent application Ser. No. 13/530,763 entitled VIRTUAL PRIVATE CLOUD THAT PROVIDES ENTERPRISE GRADE FUNCTIONALITY AND COMPLIANCE filed Jun. 22, 2012, which claims priority to U.S. Provisional Patent Application No. 61/500,036 entitled VIRTUAL PRIVATE CLOUD THAT PROVIDES ENTERPRISE GRADE FUNCTIONALITY AND COMPLIANCE filed Jun. 22, 2011 both of which are incorporated herein by reference for all purposes.

BACKGROUND OF THE INVENTION

A multitude of major trends is drastically reshaping the IT landscape. The workforce is changing: the typical worker is now highly mobile. Rather than working on a desktop within the corporate network, they are now adopting a multitude of devices and cloud applications to use both inside and outside of the office—often without IT knowledge. Because of this, a large amount of corporate data is no longer residing primarily within the corporate firewall. IT is changing: they are moving away from traditional, on-premise servers and solutions to "cloud" and Software-as-a-Service solutions, replacing large upfront deals with smaller, incremental buys. The computer industry itself is changing: the internet is becoming the de facto corporate network. This has radically changed many of the long-held distinctions between solutions and the environments in which they are expected to work. Basic concepts such as segmenting solutions across the Internet, an Intranet, and an Extranet are outdated. Solutions which are architected assuming these outdated environments are now obsolete.

Traditional file management solutions are built for the outdated environment of the intranet, focused on managing files on file servers behind corporate firewalls. They don't work for this new environment in which data is being stored across not just traditional servers within the corporate network, but also and desktops, laptops, mobile devices, cloud applications and cloud stores that are located on the internet. Each of these is currently its own unmanageable island.

Cloud computing solutions are arising to provide solutions where data can be stored. Current solutions pursue strategies of data lock-in with a single-stack world. As storage is being commoditized, others have focused on how to have customers upload as much data into their stacks as possible as a means of differentiation. Each stack operates entirely independently of one another, effectively meaning customers will have to manage not just a multitude of computers and devices but now also a variety of cloud applications. This complexity is one that customers will ultimately resist.

BRIEF DESCRIPTION OF THE DRAWINGS

Various embodiments of the invention are disclosed in the following detailed description and the accompanying drawings.

DETAILED DESCRIPTION

Figure 1:
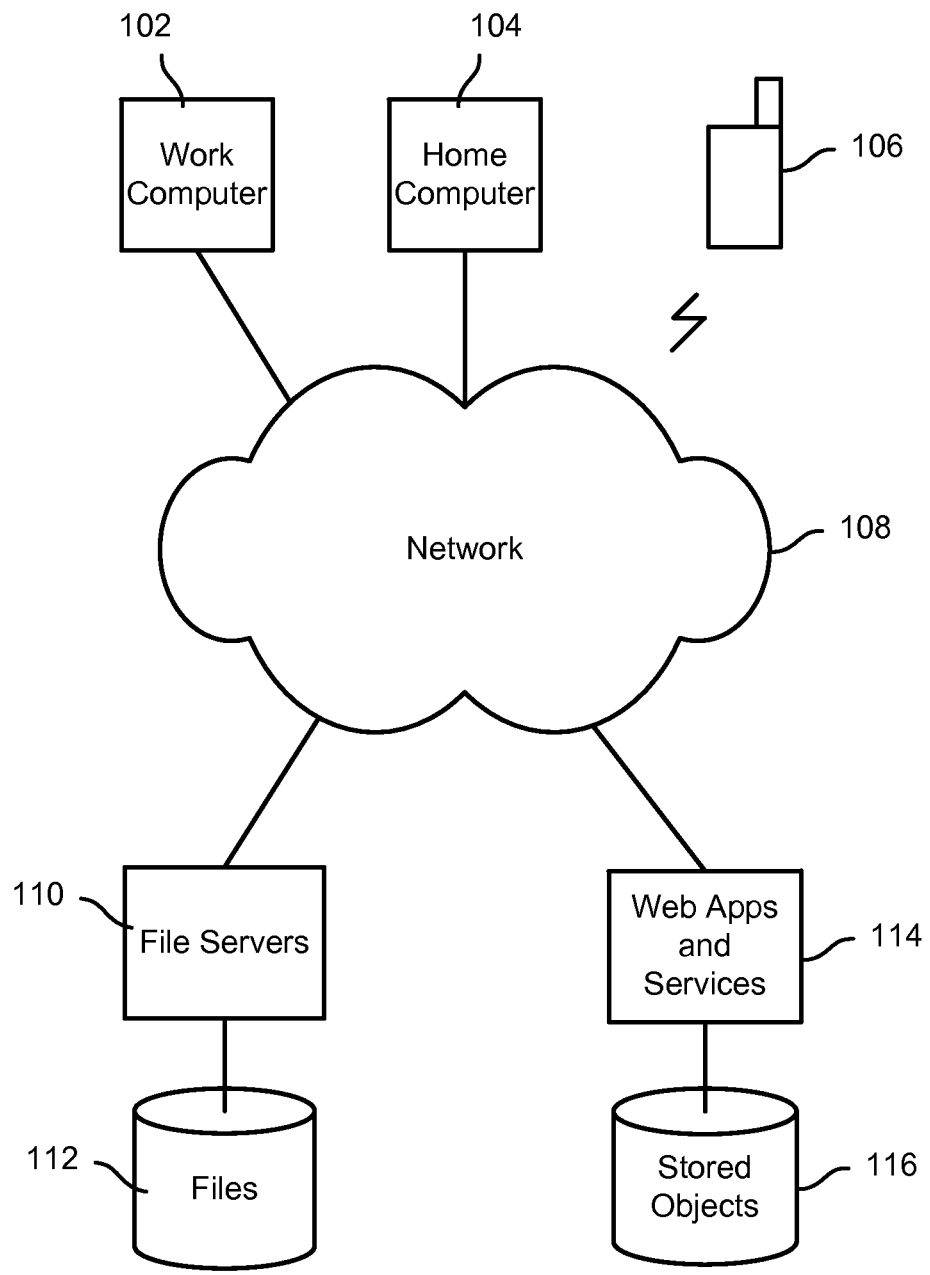
FIG. 1 is a block diagram illustrating an embodiment of a file storage environment.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Synchronized file management across multiple disparate endpoints is disclosed. In various embodiments, otherwise unmanageable islands of file (or other object) storage are unified into a single manageable entity, referred to in some embodiments as a Virtual Private Cloud. The Virtual Private Cloud in some embodiments subsumes all locations where data is created, stored, and consumed regardless of endpoint capability. For example the endpoint may be a basic website or FTP site that only understands put/get semantics, a mobile device that can perform actions but may or may not have a file system, a server or desktop that can run a rich client and can both store and process a large amount of information, or a cloud application which may have its own proprietary store and requirements. In various embodiments, the disclosed file management system and approach works across any and all of those endpoints as well as any others to provide a single governance model and file management functionality comprising in various embodiments one or more of backup, sync, sharing, and real-time collaboration in a unified manner. In various embodiments, this allows the disclosed file management system to meet not only the traditional file management requirements on legacy IT infrastructure, but also to handle all of the different endpoints which are holding and interacting with organizational and user data that reside primarily outside of the corporate firewall.

The file management system disclosed herein in various embodiments supports scale and provides flexibility across multiple and unlimited folders, users, groups, companies, devices, computers, file types, file sizes, types of internet connectivity, and arbitrary endpoints. The file management system allows users to, (i) use the native file store or experience on any endpoint. For example, a file system on a compute, a network share on a file server, an proprietary document store in the cloud, or an arbitrary store on a mobile device. (ii) continue to use or replace one or more parts of their existing IT infrastructure, (iii) have multiple public and private cloud deployments, as a non-limiting example Google Docs as an endpoint and while leveraging a private Storage Area Network as one of the backing stores as part of the file management system itself, and (iv) have IT management capabilities. Sophisticated controls and security are provided. File management complexity is hidden from the user and IT while ensuring endpoints are managed and synchronized seamlessly. Additionally, there is unlimited and differentiated versioning with no data loss in the case of conflicts and guaranteed conflict detection.

In various embodiments, users have anywhere access to any of their files or those they have permission to access, instant sync, continuous data protection backup, instant restore, sharing, and instant collaboration which makes file management and protection easy. IT has one place to set file management and end point policies to secure and manage corporate data across all file stores and end points inside and outside of the corporate network. The term file refers in various embodiments to files and/or other stored objects under management of the system.

FIG. 1 is a block diagram illustrating an embodiment of a file storage environment. In the example shown, multiple devices associated with one or more users, represented in FIG. 1 by computers 102 and 104 and mobile computing device 106, such as a smartphone, communicate via one or more networks 108 with each other and with zero or more file servers 110, each configured to store files in a file storage device 112, and zero or more web applications and/or web services having files or other stored objects associated therewith and stored in an associated object store 116. Examples of file servers 110 include without limitation collaboration platforms such as Microsoft SharePoint™ and other file servers. Examples of web applications and services include without limitation Google Apps, Google Docs, salesforce.com and other web-based services that store user files or other content objects, and file storage and/or sharing services, such as Dropbox. As noted above, in the modern enterprise and other computing environments, files (or other objects) may be created, stored, accessed, modified, deleted, and shared from any one of a wide variety of traditional and emerging hardware, software, and cloud-based solutions to create and share content.

Figure 2:
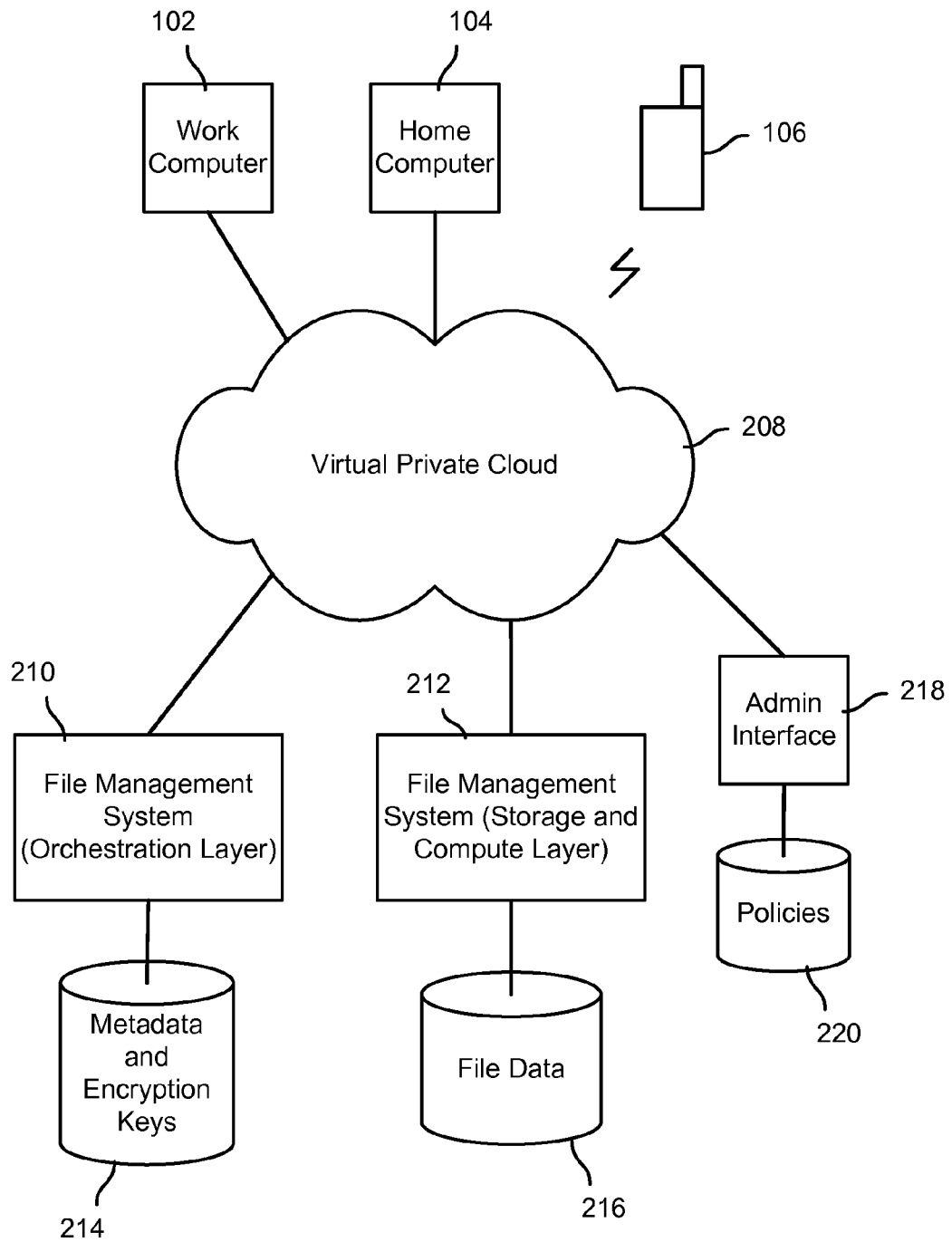
FIG. 2 is a block diagram illustrating an embodiment of a file management system.

FIG. 2 is a block diagram illustrating an embodiment of a file management system. In the example shown, content that is created, modified, deleted, etc. by one or more users of computers 102 and 104 and mobile device 106 is managed as part of a virtual private cloud 208 by a file management system that includes an orchestration layer 210 and a storage and compute layer 212. In various embodiments, a synchronization point instance is created to manage files across disparate storage systems, including without limitation the computers 102 and 104, mobile device 106, as well as file servers and web/cloud based solutions such as those represented in FIG. 1 and discussed above. The orchestration layer 210 uses metadata stored and (optionally) encryption keys stored in a metadata and encryption key store 214 to manage files included in a synchronization point. Files are stored and managed "in place" at the various endpoints at which the user(s) of the synchronization point have configured them to reside. Each endpoint has a master copy of each file it is configured to store, and the locally stored file is synchronized on an ongoing basis to propagate to other endpoints changes that are made to the local copy and to update the local copy to reflect changes made at other endpoints. At file creation and/or as updates are made at various endpoints, file content data and/or changes thereto are uploaded to the storage and compute layer 212, which performs bulk data transfers and storage, and associated processing such as encryption and compression. Storage and compute layer 212 stores file data in a file data store 216, which in some embodiments may include any backend storage suitable to store large amounts of data. Using an administrative interface 218, such as a web-based interface, IT administrators can define and store in a policy store 220, and to configure the file management system to apply and enforce, file management policies, including in various embodiments and without limitation one or more of retention policies, access restrictions (e.g., restricting access to enterprise data and/or selected data depending on user/device location), security policies to limit sharing to authorized enterprise users, etc.

Figure 3:
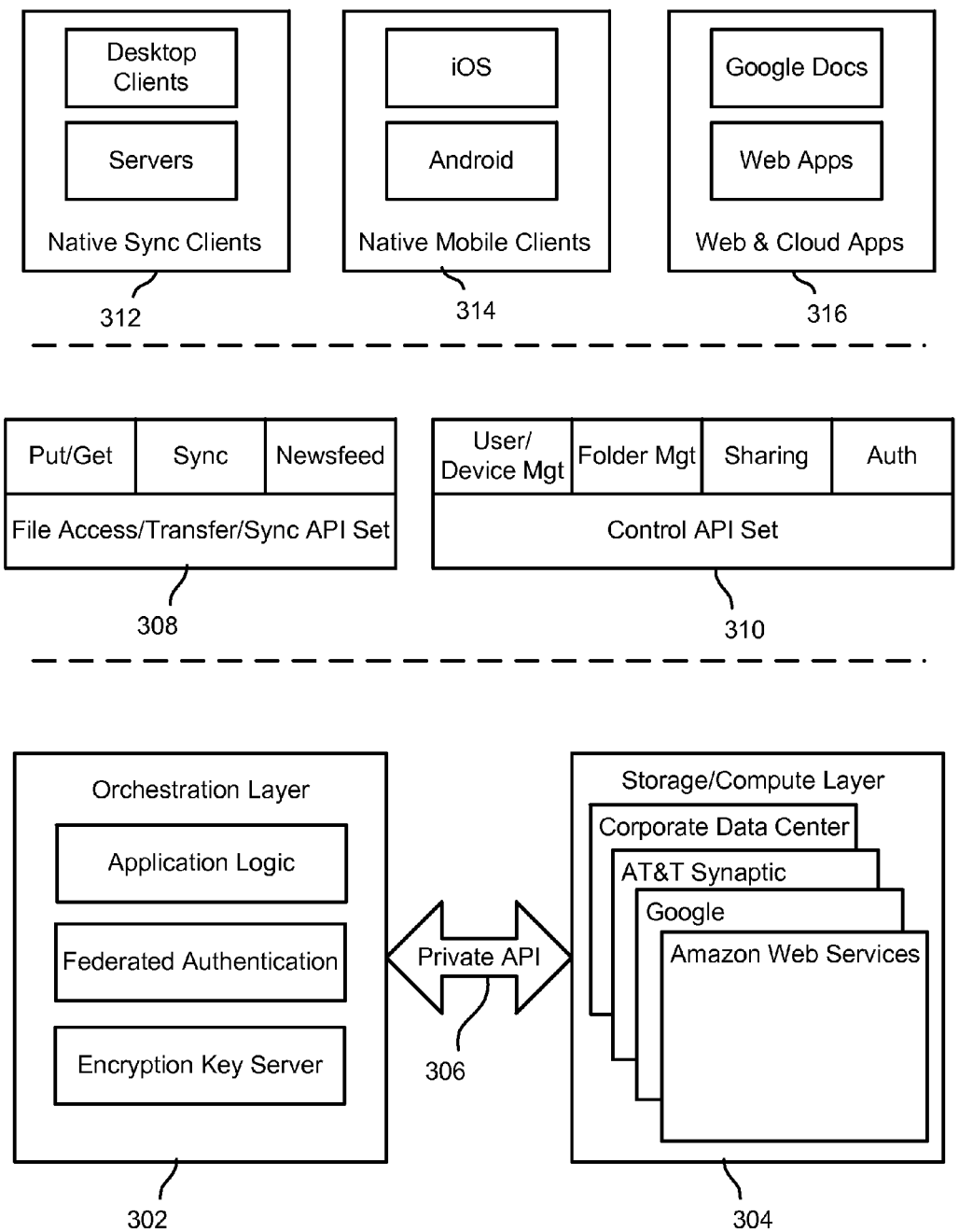
FIG. 3 is a block diagram illustrating an embodiment of a file management system.

FIG. 3 is a block diagram illustrating an embodiment of a file management system. In the example shown, the file management system includes an orchestration layer 302 and a storage and compute layer 304, which communicate with each other via a private API or other secure interface 306. The orchestration layer in the example shown includes application logic, for example to manage files across multiple dissimilar endpoints, having disparate endpoint capabilities, requirements, reliability, and/or other attributes; a federated authentication component to enable users to authenticate once to the file management system and obtain access to their files wherever they are stored, e.g., in cloud based storage and/or services; and an encryption key server to generate and manage keys to be used to encrypt file data for storage and/or transfer. In various embodiments, orchestration layer generates and stores metadata, not shown in FIG. 3, used to manage files included in a synchronization point and the endpoints with which the files and synchronization point are associated.

In the example shown in FIG. 3, the storage and compute layer 304 is configured to be used with any one or more of a wide variety of backend storage systems and/or technologies, some examples of which are shown.

Orchestration layer 302 and storage and compute layer 304 communicate with endpoints via API's included in file access/transfer/sync API set 308 and/or control API set 310, as required and/or applicable. File access/transfer/sync API set 308 includes in the example shown a put/get API to facilitate basic levels of communication with web-based services and other endpoints having a limited ability to perform (or perform reliably) file management operations that may be required to be performed; a sync API to facilitate more rich interactions with more capable endpoints, such as those on which a rich file management client software or other agent has been installed; and a newsfeed module to propagate to participating nodes events that have occurred across the synchronization point instance (e.g., at various endpoints and/or centrally at the file management system orchestration and/or storage and compute layers 302 and 304). In the example shown, control API set 310 includes a user and device management API, e.g., to add, delete, or otherwise manage users, groups of users, and devices; a folder management API, to control how files are organized on an endpoint; a sharing API to control the sharing of files stored on an endpoint; and an authentication API.

The API's in API sets 308 and 310 are used in various embodiments to communicate with and control operations at various endpoints, in a manner that is suitable for each type of endpoint. For example, for highly capable endpoints such as file or other enterprise servers and desktop/laptop computers, native sync clients 312 are provided and installed. Such clients in some embodiments may be configured to, and trusted to be relied upon to, perform file management operations on the client side, e.g., receiving at the client a newsfeed that include events that have occurred at other nodes, such as other endpoints, and performing at the endpoint processing responsive to such events. Native mobile clients 314 provide in some embodiments a subset and/or other/different capabilities than native sync clients 312. For example, an iOS device such as an iPad™ does not have a file system but does know which files or other content objects are stored at specific storage locations. In some embodiments, working with native mobile clients and a web-based or other file management interface, a hierarchical folder based view of files included in a synchronization point instance is provided at mobile devices, including those that do not natively include or use a file system or other hierarchical approach to store files or other objects. Finally, some web-based applications and services 316, such as Google Apps, do not have a concept of a "file" per se, but they do store identifiable content objects that can be presented as files and/or organized in a folder or other hierarchical as accessed via a file management system interface. By using a less rich put/get API, in some embodiments the file management system invokes such web-based applications and services to perform under strict direction and control only basic operations, including ones that must essentially be performed by them, such as to create a new file (or other object), modify a file, or delete a file.

Figure 4:
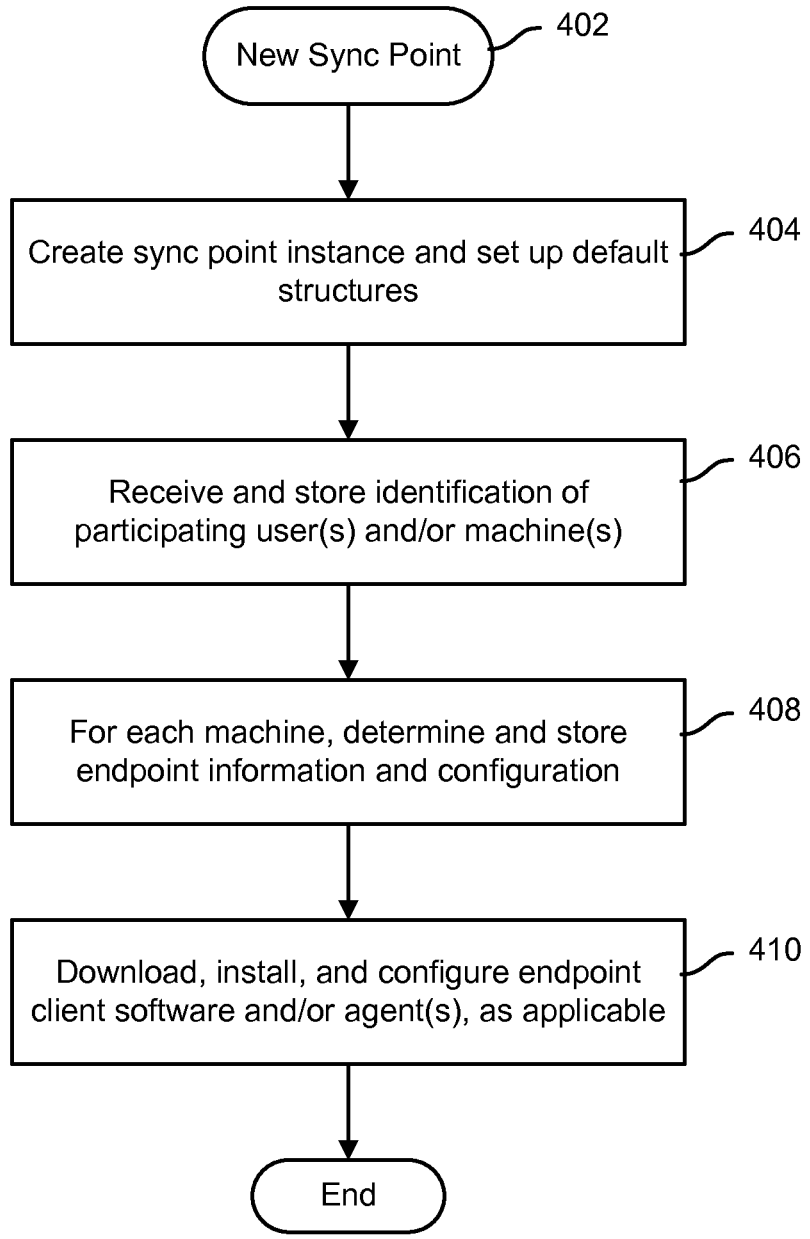
FIG. 4 is a flow diagram illustrating an embodiment of a process to establish a file management synchronization point instance.

FIG. 4 is a flow diagram illustrating an embodiment of a process to establish a file management synchronization point instance. In the example shown, an indication is received that a new synchronization point is to be created (402). A synchronization point in various embodiments includes a collection of files to be managed and maintained in sync across multiple potentially dissimilar endpoints. A synchronization point instance is created and default data structures and/or other default entities are set up (404). For example, a table to track files included in the synchronization point and a table to manage each machine (endpoint) and files as stored thereon may be created. Data identifying one or more users and one or more machines (endpoints) to be associated with the synchronization point are received (406). In some embodiments, a synchronization point may be provided and configured to provide a single user access to his/her files from any one of a plurality of devices and/or web-based services, or to provide to a plurality of users shared and synchronized access to the same set of files. For each machine, associated endpoint system and configuration system information (identify, hardware and operation system type, etc.) is received and stored (408). For each endpoint for which a sync client software or other software agent is available, the client side software is identified, downloaded to the endpoint, and caused to be installed and configured at the endpoint (410).

Figure 5:
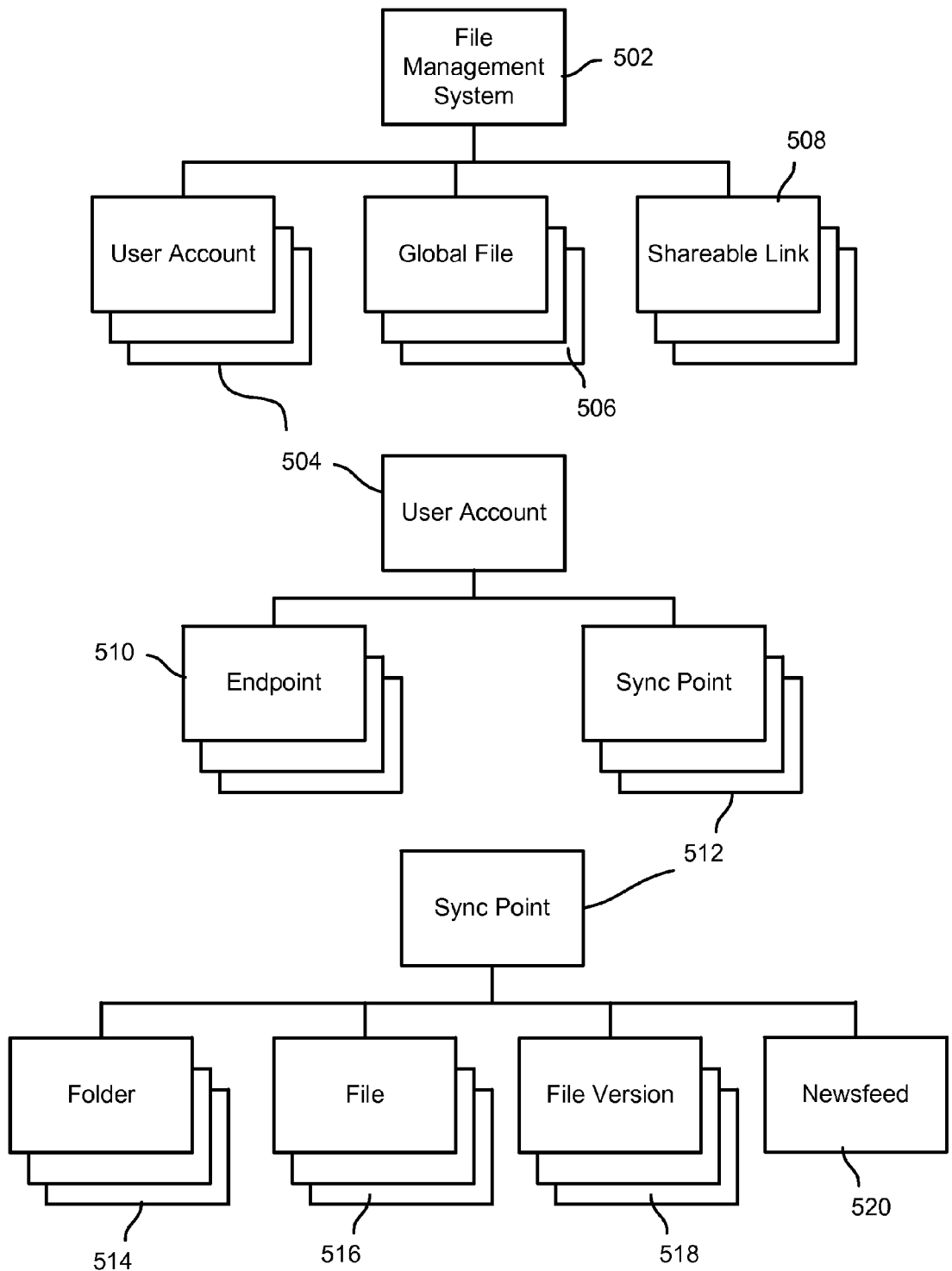
FIG. 5 is a block diagram illustrating an embodiment of a set of data structures representing entities comprising a file management system.

FIG. 5 is a block diagram illustrating an embodiment of a set of data structures representing entities comprising a file management system. In the example shown, the file management system 502 may include a plurality of user accounts 504, a plurality of global files 506, and a plurality of shareable links 508. Each user account 504 may have associated therewith one or more endpoints 510 and one or more sync points 512. Likewise, each sync point 512 may include one or more folders (or subfolders) 514, a plurality of files 516, each file having one or more file versions 518, and a newsfeed 520 to propagate events and other information among nodes included in the synchronization point instance. In various embodiments, tables or other data structures are created and stored, for example by the orchestration layer 302 of FIG. 3, to track and manage data values representing the entities shown in FIG. 5.

Figure 6:
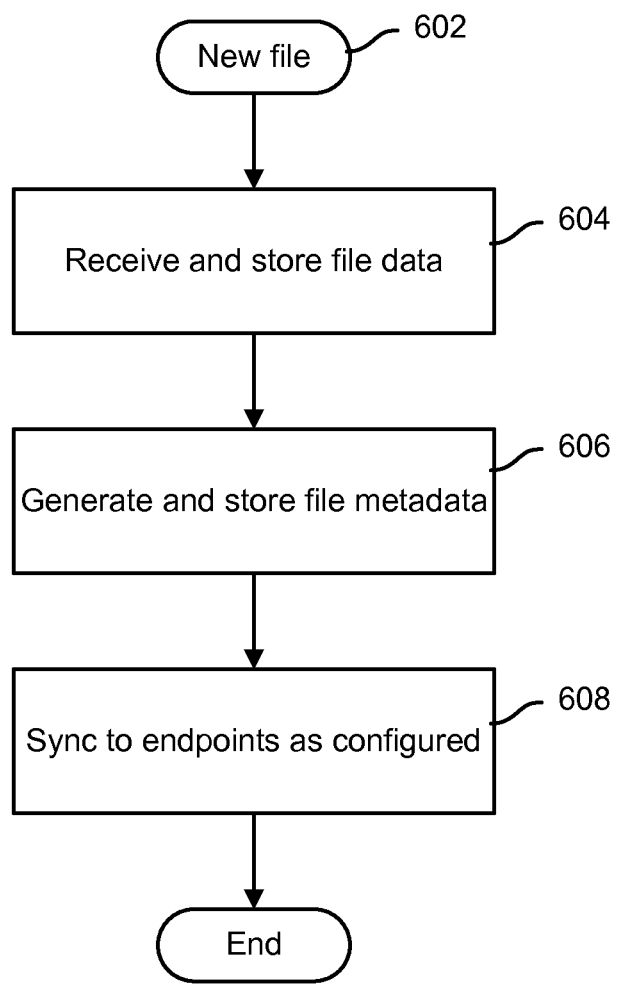
FIG. 6 is a flow diagram illustrating an embodiment of a process to create a new file.

FIG. 6 is a flow diagram illustrating an embodiment of a process to create a new file. In the example shown, on receiving, e.g., from an endpoint, an indication that a new file has been created (602), the file data for the new file is received and stored (604). Corresponding file metadata is created and stored (606). For example, a globally unique file identifier (file ID) may be assigned and an initial version number of "1" assigned to the received file data. Finally, the newly created file is synchronized to any endpoints configured to have files added to the synchronization point automatically synchronized and downloaded to that endpoint (608). In various embodiments, synchronization to other endpoints may include transforming file data as required to materialize the file at the destination endpoint in a form readable and usable at the destination to provide access to the file at the endpoint.

An end point can choose to have any file, file hierarchy, or folder synchronized. The file management system records what an end point selects to have synchronized and, depending upon policy and permissions, an endpoint may withhold specific files or folders from the file management system. From a file server or large laptop standpoint, a user may want the file management system to have everything and participate in everything. However, the user may not want a mobile device with limited capability to synchronize everything, but merely a specific set of folders or files, or none at all with data retrieved on-demand. This inclusion/exclusion capability provides flexibility not only for data synchronizing down, but also files synchronizing up to the file management system.

The file management system in various embodiments understands that a file may have one or more equivalent representations across a variety of endpoints depending upon their capabilities. File format conversions can be based on type, OS, and endpoint capabilities. The file management system in various embodiments can synchronize everything to any endpoint and can transcode the file into alternative representations while still retaining the understanding the various representations are views of the same file. Different devices, applications and silos have their own preferred representations. The file management system transcodes information into preferred formats for each endpoint. The endpoint can use the formats while understanding that these different representations represent the same file. For example, Google Docs stores documents in an HTML format internally, Microsoft Word 2007 stores documents in a compressed XML format, and Microsoft Word 2003 stores documents in a proprietary binary format. Given three separate endpoints in this example, where one is Google Docs, another is a computer with Microsoft Office 2007, and yet another is a computer with Microsoft Office 2003, the file management system can transcode the same letter between all of these different formats so that the files can be opened natively within each endpoint while recognizing actions taken against this file's representation on any given endpoint represents a change to all, propagating changes seamlessly.

The file management system can provide automatic insertion of changes into the actual file for a given endpoint. For example, integration with an Information Rights Management (IRM) system is available such that when a file is synchronized it is transformed to apply specific IRM rights on each device for source. As an example of a use case, files may be stored and edited internally, but when shared with external parties, the file is modified to include IRM directives any time the file is used or accessed on the external party's endpoints. Directives are included that specify the rights for each device, including but not limited to, permissions such as read-only, read-write and owner permissions for granular control and safety.

Figure 7:
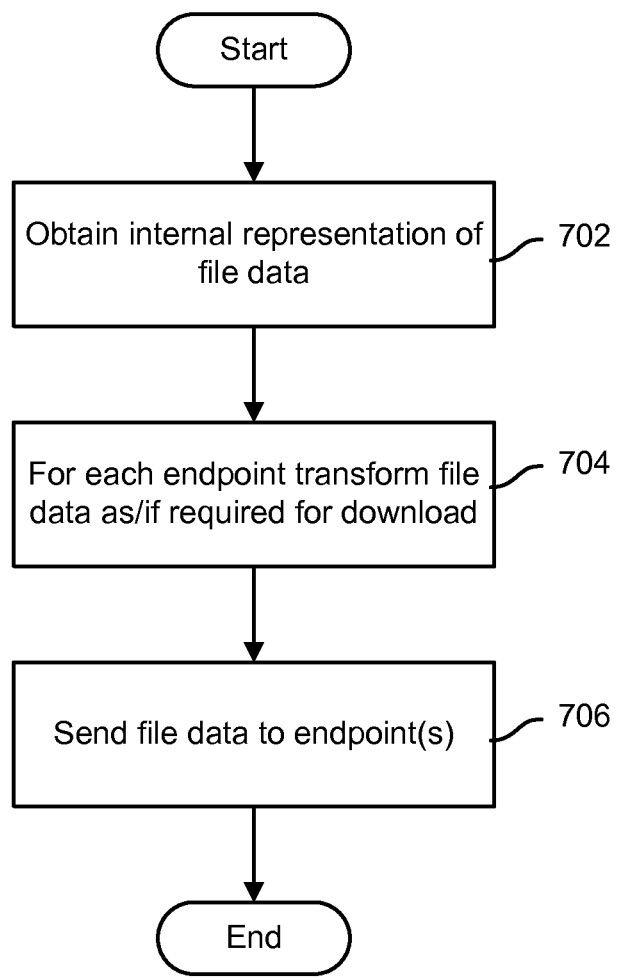
FIG. 7 is a flow diagram illustrating an embodiment of a process to sync a file to disparate endpoints.

FIG. 7 is a flow diagram illustrating an embodiment of a process to sync a file to disparate endpoints. In some embodiments, the process of FIG. 7 is used to implement step 608 of FIG. 6. In the example shown, an internal, server-side representation of the file data is obtained (702), for example read from storage at storage and compute layer 304 of FIG. 3. For each endpoint, the file data is transformed, as/if required, into a format usable at the destination endpoint to materialize the file data as a file or other object (704). The (transformed as/if needed) file data is sent to the respective destination endpoint(s) (706). At the endpoints, the local system uses the received file data, added in some embodiments by the installed file management system client/agent, if present, to materialize and provide user access to the file at the endpoint.

Figure 8:
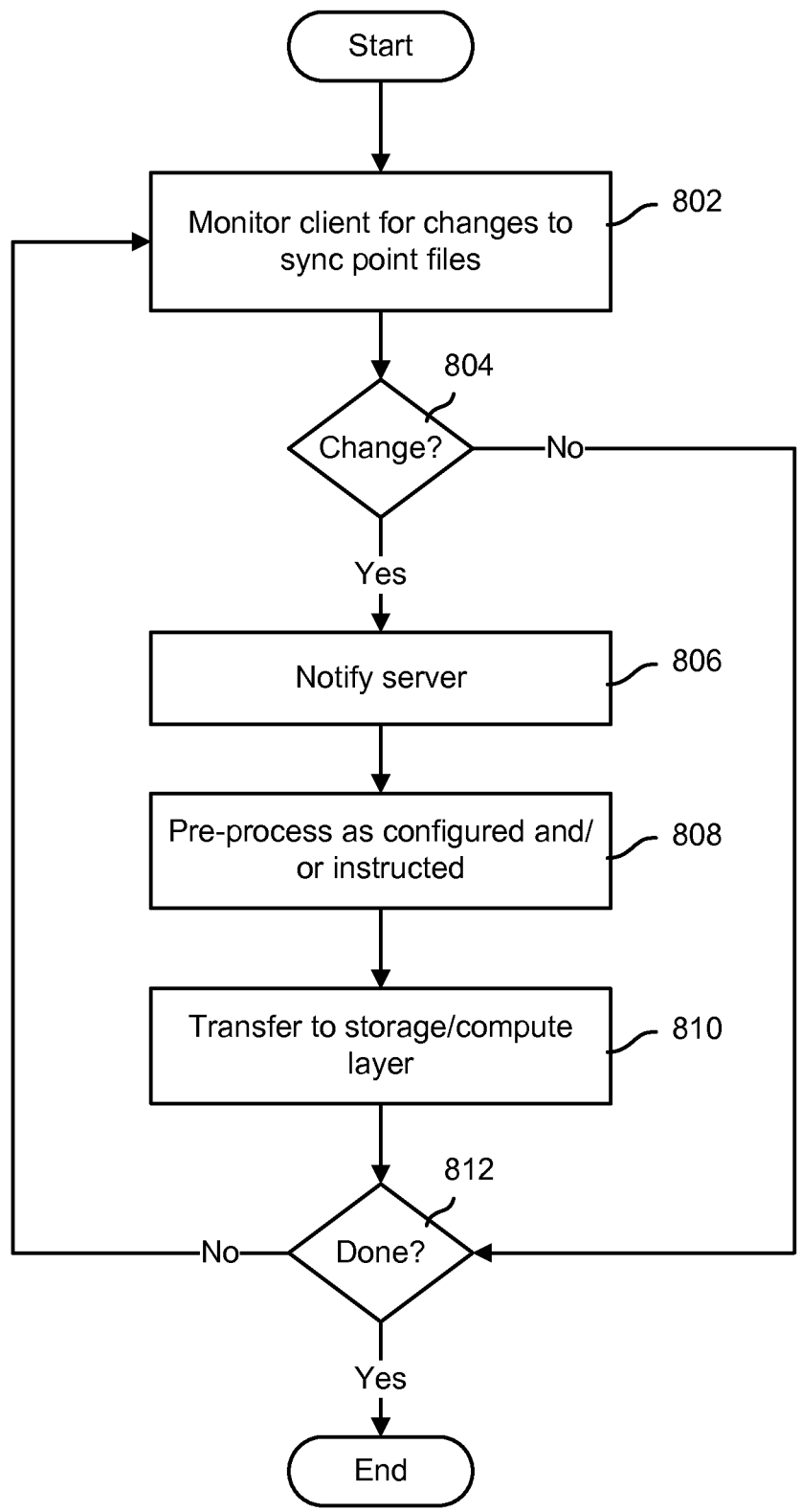
FIG. 8 is a flow diagram illustrating an embodiment of a process to detect and upload file changes made at an endpoint.

FIG. 8 is a flow diagram illustrating an embodiment of a process to detect and upload file changes made at an endpoint. In various embodiments, the process of FIG. 8 is implemented at an endpoint associated with a synchronization point. In the example shown, a file management client or other software agent monitors the endpoint for changes to synchronization point files (802). If a change to a synchronization point file is detected (804), the file manage system is notified (806), e.g., by a message sent to orchestration layer 302 of FIG. 3. In some embodiments, a queue of changes to be uploaded to the file management system is maintained at the client or other endpoint. Upload tasks are pulled from the queue, in some embodiments in an order determined based at least in part on task priority. The file data and/or portions thereof, depending on the embodiment and/or configuration, is pre-processed at the endpoint as configured and/or instructed by the orchestration layer, for example (808), prior to being transferred to the storage and compute layer (810). In some embodiments, if the endpoint does not have a rich file system management client installed, pre-processing may not be performed at the endpoint. In some embodiments, file data may be sent to a quarantine or other staging area, where pre-processing may be performed by file management system components, such as the orchestration layer 302 of FIG. 3. The process of FIG. 8 continues with successive iterations being performed as changes are detected, unless/until the process ends (812), for example the endpoint goes offline.

Figure 9:
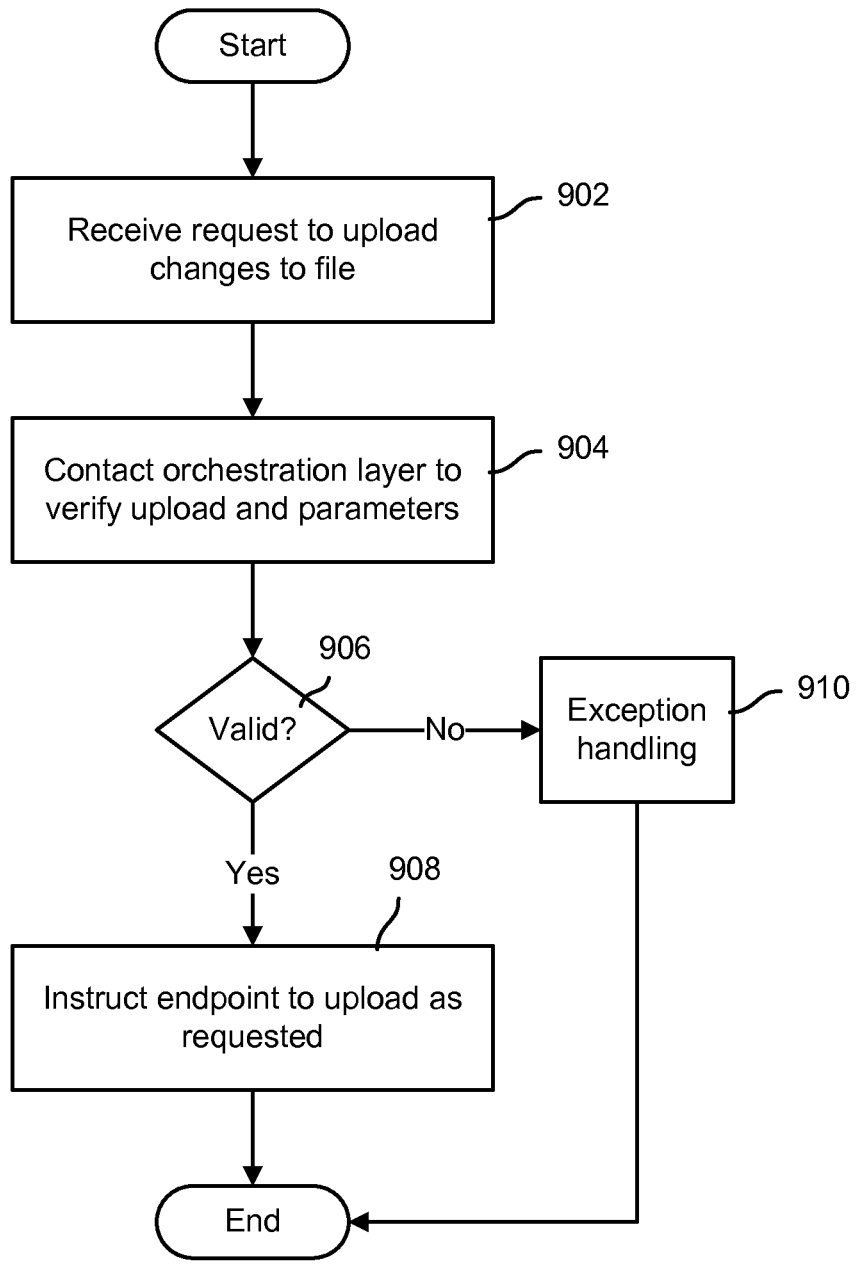
FIG. 9 is a flow diagram illustrating an embodiment of a process to receive via orchestrated upload file changes made at an endpoint.

FIG. 9 is a flow diagram illustrating an embodiment of a process to receive via orchestrated upload file changes made at an endpoint. In various embodiments, the process of FIG. 9 is implemented at the storage and compute layer of a file management system, such as storage and compute layer 304 of FIG. 3. In the example shown, a request to upload changes to a file is received (902). For example, a request to upload a file and/or changes thereto may be received from a synchronization client installed at an endpoint. The orchestration layer of the file management system is contacted to verify the information provided in the request and to confirm that the request is authorized (904). Examples of verification processing that may be performed by the orchestration layer include, without limitation, verifying an identify of the requesting user, confirming that an associated user account is valid and has not exceeded any account limitations, such as available storage space, verifying that a session key provided with the request is valid, and confirming in the case of an upload that the user is authorized to add or update an object in a synchronization point to which upload is requested. In various embodiments, configuring the storage and compute layer to check with the orchestration layer in this way ensures that only authorized file data upload operations are allowed to be performed, helping to ensure that potentially malicious data is not uploaded to the storage and compute layer and/or synchronized to other endpoints. If the orchestration layer confirms the validity of the information provided by the endpoint (906), the storage and compute layer instructs the endpoint to upload the file data as requested (908). Otherwise, exception handling is performed (910). Examples of exception handling include without limitation refusing the request, logging the request and refusal, sending an alert, and causing the now suspect file data to be uploaded to a quarantine storage area, for example for further evaluation and/or processing.

Figure 10:
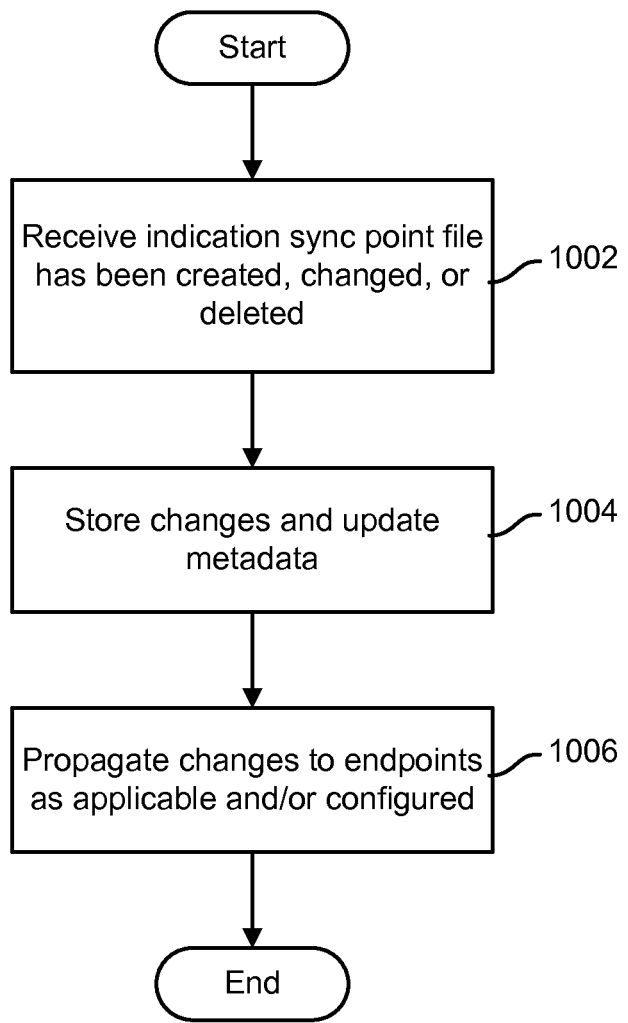
FIG. 10 is a flow diagram illustrating an embodiment of a process to receive and propagate changes made to files in a synchronization set.

FIG. 10 is a flow diagram illustrating an embodiment of a process to receive and propagate changes made to files in a synchronization set. In various embodiments, the process of FIG. 10 is implemented by an orchestration layer, such as orchestration layer 302 of FIG. 3. In the example shown, an indication is received that a synchronization point file has been created, changed, or deleted (1002). File data reflecting changes to the file is stored, for example via a storage and compute layer, and associated file metadata is updated (1004). File changes are propagated to other endpoints associated with the synchronization point, as applicable and/or as each endpoint is configured (1006).

In various embodiments, separating the storage and compute function from the orchestration function of the file management system enables any backend storage capable of performing bulk data storage and transfer operations, and associated operations such as encryption and compression, to be used to provide a file management system as disclosed herein.

In various embodiments, the approach disclosed herein enables enterprise or other policies to be defined and enforced with respect to files or data included in an endpoint and/or users thereof.

Figure 11:
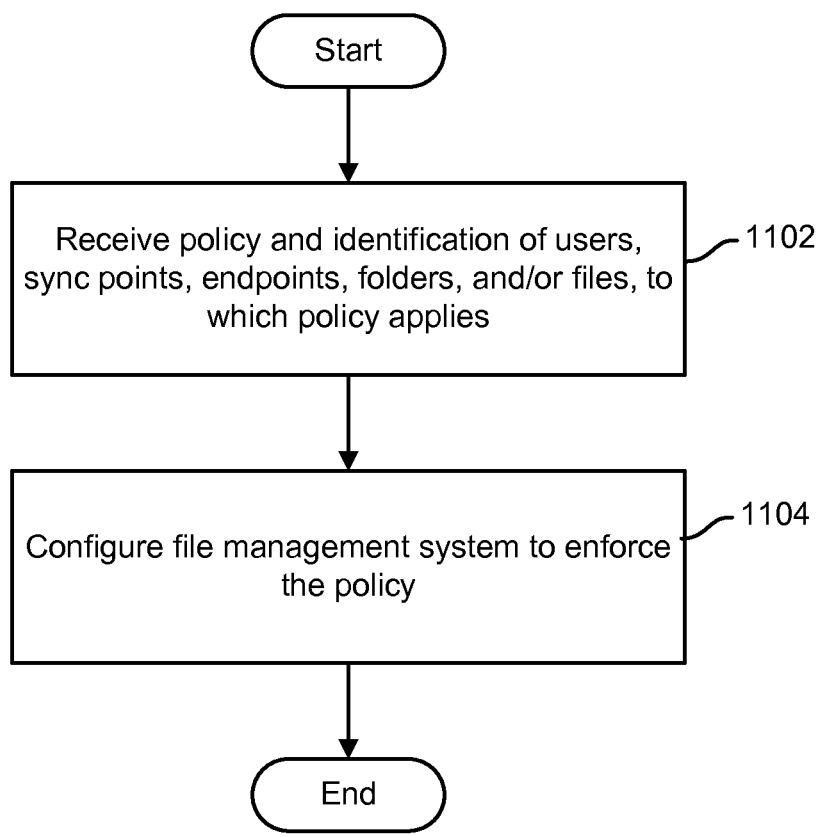
FIG. 11 is a flow diagram illustrating an embodiment of a process to define a file management related policy.

FIG. 11 is a flow diagram illustrating an embodiment of a process to define a file management related policy. In the example shown, a policy definition is received and stored, along with an identification of users; groups of users; synchronization points; endpoints; and files, folders, or other data objects to which the received policy is to be applied (1102). The file management system is configured to enforce the policy (1104). Example of such policies include, without limitation, retention policies; access policies that restrict access to files using certain devices and/or based on time of day, location, etc.; security policies; etc. In some embodiments, the policy is propagated to different endpoints to be enforced at the endpoint. For example, a desktop client may be configured to enforce the policy at the desktop computer at which the client is installed, or a third party application may be invoked and/or configured to enforce the policy. In some embodiments, the client or third party application may further propagate the policy. For example, an iPad file management application configured to enforce a file management policy may tell third party applications on the iPad to behave in a certain way with respect to files under management of the file management system.

Figure 12:
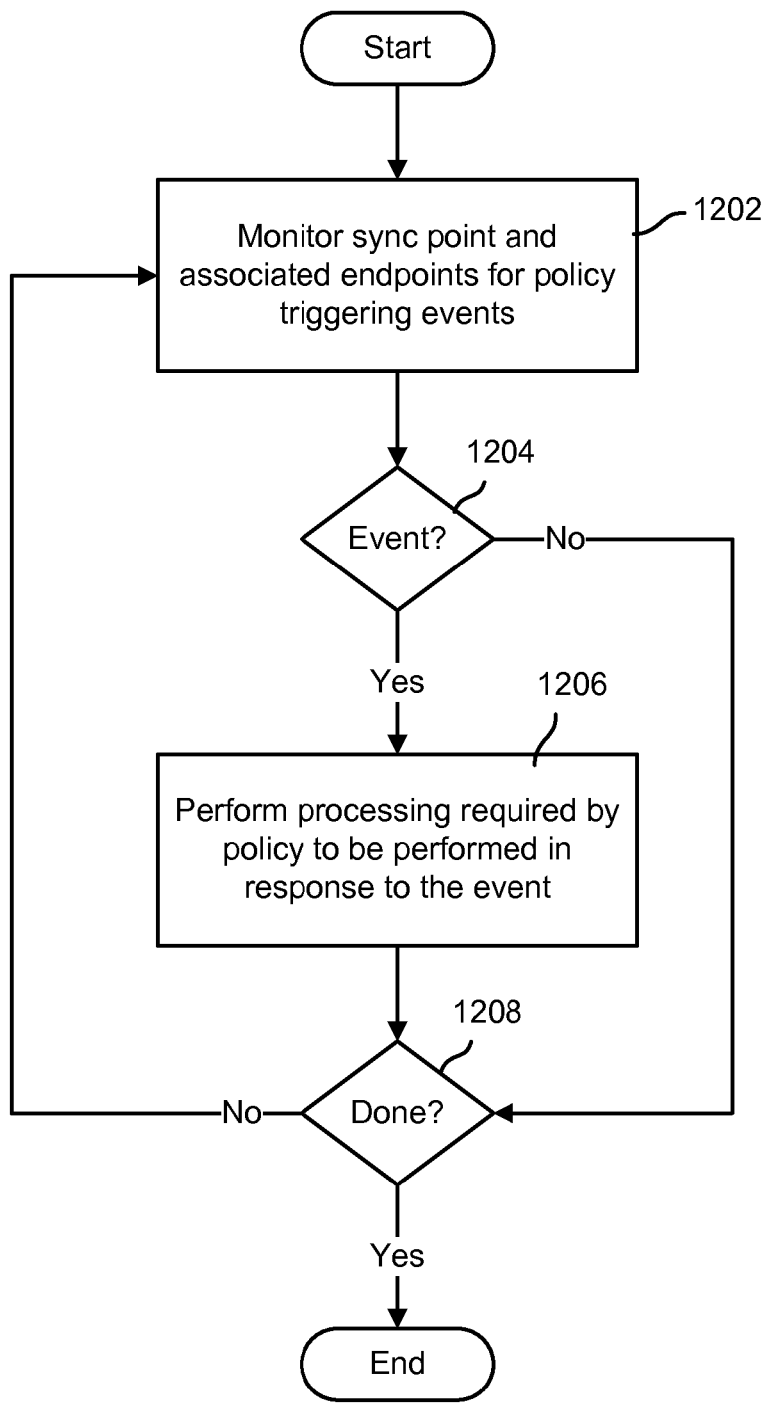
FIG. 12 is a flow diagram illustrating an embodiment of a process to enforce a file management system policy.

FIG. 12 is a flow diagram illustrating an embodiment of a process to enforce a file management system policy. In the example shown, a synchronization point and files and endpoints associated with the synchronization point are monitored to detect the occurrence of any event that might trigger a policy (1202). Examples of events that might trigger a policy include, without limitation, actions taken or attempted to be taken with respect to a file to which the policy applies, actions taken or attempted to be taken at an endpoint to which the policy applies, and actions taken or attempted to be taken by or on behalf of a user (e.g., user account) to which the policy applies. Upon detection of occurrence of a policy-triggering event (1204), responsive processing that the policy requires to be performed upon occurrence of the event is performed (1206). For example, if an attempt to access a file is made using a prohibited device, or at a prohibited time of day, or from a prohibited location, the responsive action may include preventing access and/or returning a response or notification indicating that access is denied and the reason for denial. The process continues unless/until done (1208), for example, the system is taken offline.

Figure 13:
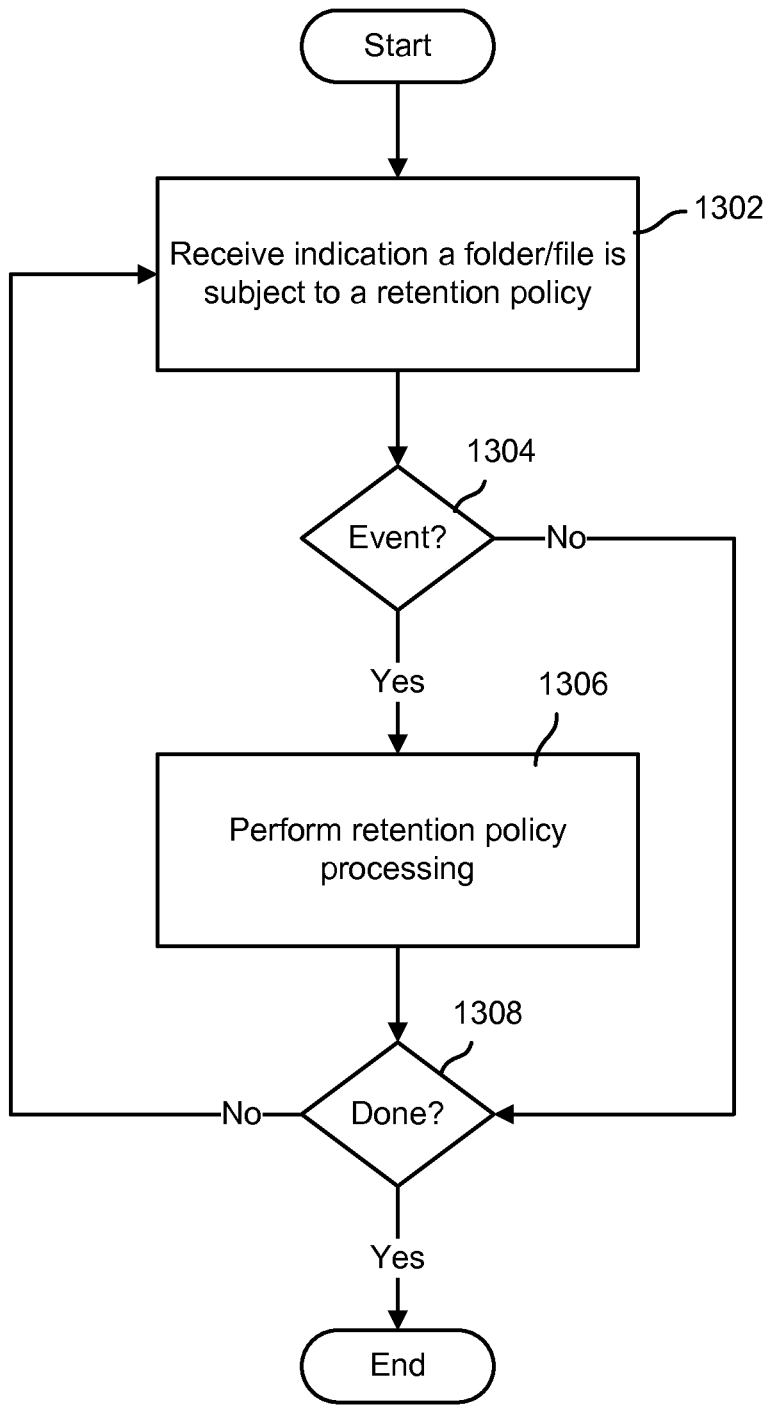
FIG. 13 is a flow diagram illustrating an embodiment of a process to enforce a retention policy.

FIG. 13 is a flow diagram illustrating an embodiment of a process to enforce a retention policy. In the example shown, an indication is received that a file and/or folder is subject to a retention policy (1302). Upon occurrence of a triggering event, such as file creation, file deletion, expiration of a prescribed retention period, etc. (1304), retention policy processing, e.g., as defined in the applicable retention policy, is performed (1306). For example, in the case of file deletion, a retention policy that requires a deleted file to be preserved for a year after deletion may result in the deleted file being retained on the endpoint, but the file metadata may be changed to include or point to a delete placeholder so that the file appears to the user to have been deleted from the endpoint and throughout the synchronization point. The process continues unless/until done (1308), for example, the system is taken offline.

Figure 14:
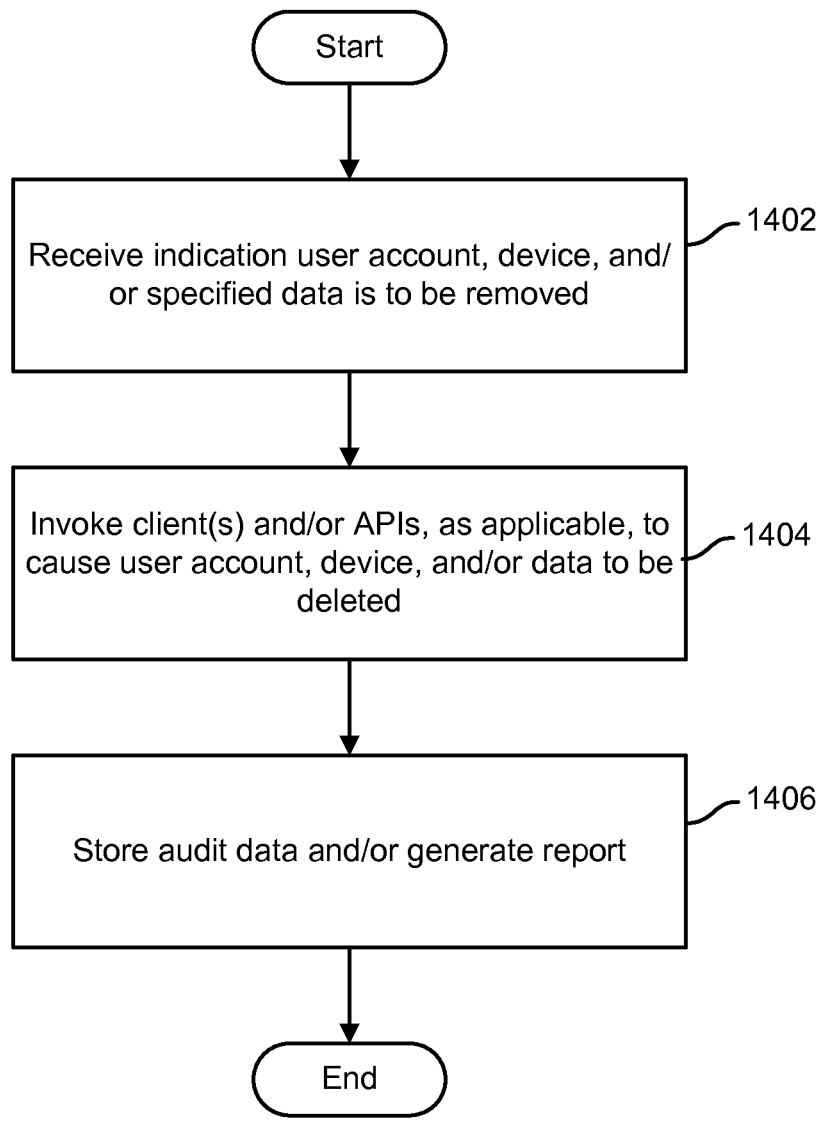
FIG. 14 is a flow diagram illustrating an embodiment of a process to perform policy compliance processing.

FIG. 14 is a flow diagram illustrating an embodiment of a process to perform policy compliance processing. In the example shown, an indication is received that a user account is to be disable, a device wiped remotely (i.e., data thereon erased remotely), and/or specified data is to be removed from a synchronization point, e.g., as defined and/or required by an applicable policy (1402). A client (if installed) and/or one or more API's are invoked, as applicable, to cause the required compliance and/or administrative processing, such as disabling a user account, wiping a device, or deleting specified data (1404). Audit data documenting that the compliance action has been completed successfully is stored and/or desired reports generated (1406).

In various embodiments, a file management system as described herein provides the visibility into and control over endpoint machines that may be needed to apply and enforce enterprise-wide file management related policies, and to facilitate central administrative control over enterprise users and files.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of managing files, comprising:
receiving, at a file management system, a policy to be applied with respect to a synchronization set, wherein the policy comprises a retention policy; and
ensuring compliance with the policy across a plurality of heterogeneous endpoints associated with the synchronization set by propagating the policy to the heterogeneous endpoints, wherein the plurality of endpoints are associated with a plurality of computing systems respectively including one or more non-transitory computer-readable storage mediums, and wherein each of the endpoints is configured to enforce at the endpoint policies received from the file management system, including by responding in a manner prescribed by the policy to occurrence of a policy-triggering event defined in the policy,
wherein the policy restricts access to a file from one or more of the endpoints,
wherein the policy triggering event comprises receipt of a request to delete a file to which the retention policy applies,
wherein at least partially in response to the policy trigger event, the file is marked as deleted at one or more endpoints at which the file has been stored, and a copy of the file is retained until expiration of a retention period specified in the policy, and
wherein ensuring compliance with the policy includes preventing access to the file by the one or more endpoints at which access is restricted.

2. The method of claim 1, wherein each of the endpoints is configured to store or can access at least a subset of files to which the policy is to be applied.

3. The method of claim 1, wherein the policy comprises one or more of a retention policy, a security policy, and an access restriction policy.

4. The method of claim 1, wherein enforcing comprises:
monitoring the endpoint to detect the occurrence of the policy-triggering event; and
responding to the occurrence by performing operations prescribed by the policy.

5. The method of claim 1, wherein the policy restricts access to a file upon the occurrence of the policy-triggering event, and wherein ensuring compliance with the policy includes preventing access to the file upon the occurrence of the policy-triggering event.

6. The method of claim 1, wherein:
the policy comprises a retention policy; and
responding comprises detecting the occurrence of the policy-triggering event and performing a retention policy operation prescribed by the retention policy.

7. The method of claim 1, wherein the copy is stored centrally.

8. The method of claim 1, wherein the copy is stored, but not made visible to users, at one or more of the endpoints.

9. The method of claim 1, further comprising providing an administrative user interface to enable the policy to be defined.

10. The method of claim 9, wherein the administrative user interface is configured to receive an identification of files to which the policy is to be applied.

11. The method of claim 1, further comprising creating and storing an audit record or other data that evidences that a compliance action required by the policy has been performed.

12. The method of claim 1, further comprising taking, with respect to a file as stored at a first endpoint, an action required by the policy and propagating an effect of the action to other endpoints.

13. The method of claim 1, wherein the policy requires data associated with one or more of a file, a user, an endpoint, and a device to be deleted.

14. The method of claim 1, further comprising initiating remotely an operation to cause data associated with a file, user, endpoint, and device, to be deleted.

15. The method of claim 14, wherein the operation causes associated file management system metadata to be updated or deleted.

16. The method of claim 1, wherein at least one of the endpoints corresponds to a network storage system that provides access to one or more files stored on the associated one or more non-transitory computer-readable storage medium.

17. The method of claim 16, wherein the network storage system is associated with a web service that provides a storage service that provides access to one or more files stored on the associated one or more non-transitory computer readable storage medium.

18. The method of claim 1, wherein one or more of the plurality of endpoints is connected to the file management system over a network.

19. The method of claim 1, wherein one or more of the plurality of endpoints is connected to the file management system via the Internet.

20. A file management system, comprising:
a processor configured to:
  receive, at a file management system, a policy to be applied with respect to a synchronization set, wherein the policy comprises a retention policy; and
  ensure compliance with the policy across a plurality of heterogeneous endpoints associated with the synchronization set by propagating the policy to the heterogeneous endpoints, wherein the plurality of endpoints are associated with a plurality of computing systems respectively including one or more non-transitory computer-readable storage mediums, and wherein each of the endpoints is configured to enforce at the endpoint policies received from the file management system, including by responding in a manner prescribed by the policy to occurrence of a policy-triggering event defined in the policy, wherein the policy restricts access to a file from one or more of the endpoints, wherein the policy triggering event comprises receipt of a request to delete a file to which the retention policy applies, wherein at least partially in response to the policy trigger event, the file is marked as deleted at one or more endpoints at which the file has been stored, and a copy of the file is retained until expiration of a retention period specified in the policy, and wherein ensuring compliance with the policy includes preventing access to the file by the one or more endpoints at which access is restricted; and
a memory or other storage device coupled to the processor and configured to store the policy.

21. The system of claim 20, wherein enforcing comprises:
monitoring the endpoint to detect the occurrence of the policy-triggering event; and
responding to the occurrence by performing operations prescribed by the policy.

22. The system of claim 20, wherein each of at least a subset of the endpoints is configured to store or can access at least a subset of the files to which the policy is to be applied.

23. A computer program product to manage files, the computer program product being embodied in a tangible, non-transitory computer readable storage medium and comprising computer instructions for:
receiving, at a file management system, a policy to be applied with respect to a synchronization set, wherein the policy comprises a retention policy; and
ensuring compliance with the policy across a plurality of heterogeneous endpoints associated with the synchronization set by propagating the policy to the heterogeneous endpoints, wherein the plurality of endpoints are associated with a plurality of computing systems respectively including one or more non-transitory computer-readable storage mediums, and wherein each of the endpoints is configured to enforce at the endpoint policies received from the file management system, including by responding in a manner prescribed by the policy to occurrence of a policy-triggering event defined in the policy,
wherein the policy restricts access to a file from one or more of the endpoints,
wherein the policy triggering event comprises receipt of a request to delete a file to which the retention policy applies,
wherein at least partially in response to the policy trigger event, the file is marked as deleted at one or more endpoints at which the file has been stored, and a copy of the file is retained until expiration of a retention period specified in the policy, and
wherein ensuring compliance with the policy includes preventing access to the file by the one or more endpoints at which access is restricted.

* * * * *